Patented Sept. 8, 1931

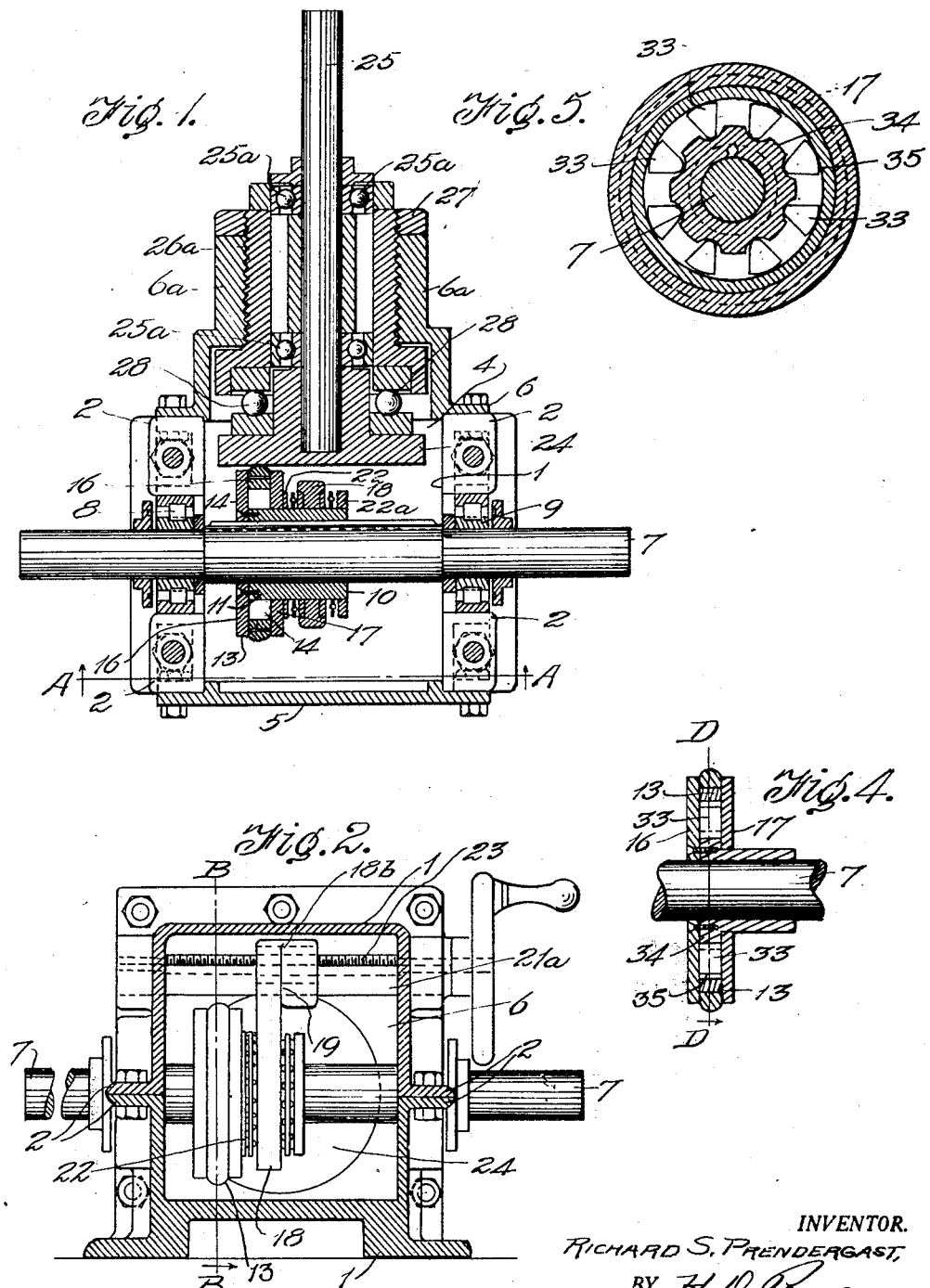

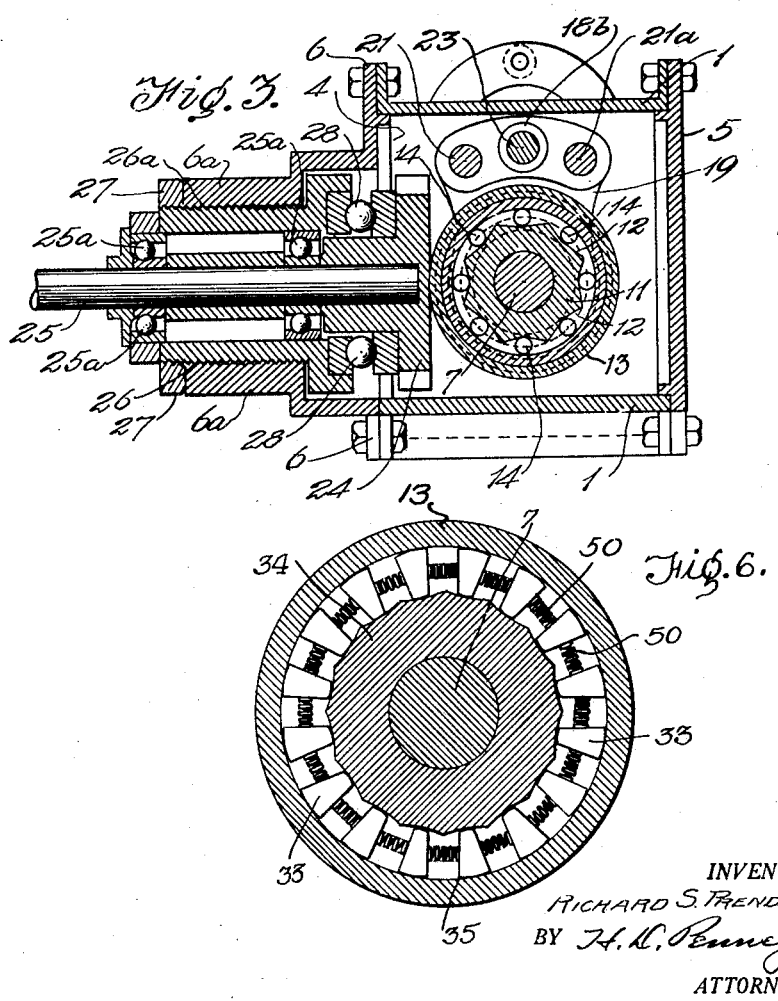

1,822,601

UNITED STATES PATENT OFFICE

RICHARD SAMUEL PRENDERGAST, OF LONDON, ENGLAND, ASSIGNOR, BY DIRECT AND MESNE ASSIGNMENTS, TO KEENOK GEARS LIMITED, OF LONDON, ENGLAND, A COMPANY OF GREAT BRITAIN

FRICTION GEARING

Application filed May 23, 1927, Serial No. 195,061, and in Great Britain June 1, 1926.

This invention relates to friction gearing, and it has for its object to provide means whereby the degree of pressure between the contacting surfaces of two members of a friction gear may be automatically adjusted and maintained at a point such as will prevent slip between them.

To this end the invention provides means whereby the force employed to drive the members automatically tends in effect to move one or more of said members in the direction of its contacting surface, so that the pressure between the contacting surfaces is maintained at the desired ratio to the load which tends to produce slip.

According to one form of the invention, as applied to a variable speed gear, we may use a plain disc on the input shaft, and make the driven wheel adjustable in regard to its diameter. For example the driven wheel may consist of an inner boss or disc mounted on the shaft, the circumference of such disc may be shaped so that balls or rollers may be mounted thereon, and be surrounded by an annular body. The balls or rollers would then tend to roll on an inclined plane and thereby to move the annular body in its own plane when the latter is put under tangential pressure by friction between it and the driving wheel. Thus, as will be readily understood, the annular body which normally, when the parts are at rest, is caused by the pressure of the surface contacting therewith to assume a position where it is eccentric to the centre of rotation under a load is urged by the balls or rollers to assume a position concentric to the centre of rotation. By this means the desired pressure between the contacting surfaces of the driving and driven body is secured.

In all cases the inclination of the plane on which the rollers rest must be such that the radial pressure which the rollers exert on the annular body is sufficient to provide the required pressure between the contacting surfaces of the gear members. To maintain uniform action of all the balls or rollers, springs may be employed to bring each roller normally to the desired position.

In order that the invention may be the better understood drawings are appended illustrating some forms of the invention in which:—

Fig. 1 is a sectional plan of a friction gear embodying the present invention.
Fig. 2 is a section taken on line A A Fig. 1.
Fig. 3 is a section taken on line B B Fig. 2.
Fig. 4 is a sectional view showing a modification.
Fig. 5 is a section on line D D Fig. 4.
Fig. 6 is a sectional view showing a modification.

Referring to Figs. 1 to 3 of the appended drawings 1 indicates an outer casing formed in two parts connected together by means of bolts passing through flanges 2 and having openings 3 and 4 for which covers 5 and 6 are provided. 7 indicates a driven or output shaft mounted in roller bearings 8, 9. Slidably secured to the shaft 7 is a sleeve 10 having at its inner end a flange 11, the periphery of which is shaped to provide a series of oppositely inclined cam surfaces 12, as shown more clearly in Fig. 3. Surrounding the flange 11 is an annular body 13 of such diameter as to leave a space between it and the said flange, said space being sufficient to accommodate rollers 14 normally disposed at the bottom of the recesses formed by the oppositely inclined cam surfaces 12. 16, 17 indicate discs disposed one on each side of the flange 11, the outer disc being secured to the sleeve 10 by bolts or screws, the inner disc being shrunk upon said sleeve. Revolubly mounted upon the sleeve 10 is a plate 18 having a radially disposed projection 19 perforated for the passage of rods 21, 21a secured at their ends to the sides of the casing and designed to prevent the rotation of the plate 18. The movement of the plate 18 longitudinally of the sleeve is prevented by collars 22, 22a secured to the said sleeve.

The plate 18 is perforated at 18a and secured within the said perforation is a nut 18b engaging a screwed spindle 23 supported in bearings formed in the sides of the case 1, said spindle being extended as shown upon the outside of the case and having thereon a hand wheel whereby the ready rotation of the spindle may be effected, thereby moving the sleeve in one or other direction longitudinally of shaft 7.

Formed integral with the cover 6 is a hollow extension 6a, the inner end of the bore of which is enlarged to accommodate a disc 24 secured to a spindle 25 disposed at a right angle to shaft 7, the outer face of said disc 24 contacting with the annular body 13, and tending to displace the body 13 in its own plane.

The spindle 25 is supported by means of ball bearings indicated by 25a, within a sleeve 26 having an externally screw-threaded portion 26a engaging a thread formed in the outer end of the extension 6a being secured therein by means of a lock-nut 27.

28 indicates a thrust bearing interposed between the back of the disc 24 and the end of the sleeve 26.

In the foregoing example the desired movement is effected by means of cam surfaces in cooperation with rollers or balls. In Figs. 4 and 5 there is illustrated an arrangement according to which, in place of balls or rollers the member 13 is acted upon by radially disposed bodies 33 of wedge-shaped outline the inner ends of which are semicircular and engage recesses formed to receive them in the periphery of a disc 34. The outer ends of the bodies are provided with cam surfaces 35 which engage the inner surface of the member 13, the arrangement being such that relative rotation between the member 13 and disc 34 will cause the bodies 33 to act to adjust said member 13. Springs 50, such as are shown in Fig. 6, or other suitable means may be employed to maintain the bodies 33 in their correct positions when not under load.

Claims:

1. In a friction gear, a shaft, a member, comprising an inner part, having thereon a continuous periphery, secured to said shaft and concentrically disposed with regard to the axis of rotation of said shaft, an outer part, having a circular periphery, encompassing said inner part, eccentrically disposed with regard to the center of rotation of said shaft, when in contact with another gear, and having its center on the side of said axis, which is remote from said other gear, peripheral cam surfaces on said inner part and rolls, interposed between said surfaces and said outer part, whereby, when in contact with said other gear, said outer part is impelled to tend to return to concentricity with regard to the axis of rotation of said shaft, thereby keeping contact with said other gear.

2. In a friction gear a shaft, a member, comprising an inner part, having thereon a continuous periphery, secured to said shaft and concentrically disposed with regard to the axis of rotation of said shaft, an outer part, having a circular periphery, encompassing said inner part, eccentrically disposed with regard to the axis of rotation of said shaft when in contact with another gear, and having its center on the side of said axis which is remote from said other gear, peripheral outwardly concave cam surfaces on said inner part, and rolls, interposed between said surfaces and said outer part, whereby, when in contact with said other gear, said outer part is impelled to tend to return to concentricity with the axis of rotation of said shaft, thereby keeping contact with said other gear.

3. In a friction gear a shaft, a member, comprising an inner part, having a continuous periphery, secured to said shaft and concentrically disposed with regard to the axis of rotation of said shaft, an outer part, having a circular periphery, encompassing said inner part, eccentrically disposed with regard to the axis of rotation of said shaft, when in contact with another gear, and having its center on the side of said axis which is remote from said other gear, peripheral outwardly concave cam surfaces on said inner part and cam means, interposed between said surfaces and said outer part, whereby, when in contact with said other gear, said outer part is impelled to tend to return to concentricity with the axis of rotation of said shaft, thereby keeping contact with said other gear.

4. In a friction gear a shaft, a member, comprising an inner part, having a continuous periphery, secured to said shaft and concentrically disposed with regard to the axis of rotation of said shaft, an outer part, having a circular periphery, encompassing said inner part, eccentrically disposed with regard to the axis of rotation of said shaft when in contact with another gear, and having its center on the side of said axis, which is remote from said other gear, peripheral outwardly concave cam surfaces on said inner part, cam means, interposed between said surfaces and said outer part, and resilient means interposed between consecutive cam means, whereby, when in contact with said other gear, said outer part is impelled to tend to return to concentricity with the axis of rotation of said shaft, thereby keeping contact with said other gear.

5. In a pair of friction gears a revolvably mounted friction gear and another gear, to contact with said first mentioned gear, positioned in a plane transversely to the plane of said first mentioned gear, said other gear comprising an inner part, concentrically disposed to the axis of rotation thereof, an outer part, having a circular periphery, encompassing said inner part, eccentrically disposed to the axis of rotation thereof when in contact with said first mentioned gear, and having its center on the side of said axis, which is remote from said first mentioned gear, peripheral cam surfaces on said inner part and rolls, interposed between said surfaces and said outer part, whereby, when in contact with another gear, said outer part is impelled to tend to return to concentricity with regard to the axis of rotation thereof, thereby keeping contact with said first mentioned gear.

6. A pair of friction gears revolvably mounted to contact with each other, one of said gears comprising an inner part, concentrically disposed to the axis of rotation thereof, an outer part, having a circular periphery, encompassing said inner part, eccentrically disposed to the axis of rotation thereof when in contact with the other gear of said pair and having its center on the side of said axis, which is remote from said other gear, peripheral cam surfaces on said inner part and rolls interposed between said surfaces and said outer part, whereby, when in contact with said other gear, said outer part is impelled to tend to return to concentricity with the axis of rotation thereof, thereby keeping contact with said other gear.

7. A pair of friction gears, revolvably mounted to contact with each other, one of said gears comprising an inner part, concentrically disposed with the axis of rotation thereof, an outer part, having a circular periphery, encompassing said inner part, eccentrically disposed to the axis of rotation thereof when in contact with the other gear of said pair and having its center on the side of said axis, which is remote from said other gear, and means, coacting with said parts for causing, when said gears are in contact with each other and a load is imposed, said outer part to tend to return to concentricity with the axis of rotation of said inner part and to press into firm contact with the other gear.

8. In a friction gear an element comprising an inner member, concentrically disposed with regard to the centre of rotation, an outer member, eccentrically disposed with respect to the centre of rotation, said members rotating as one body, peripheral cam surfaces upon one member and rollers engaging said cam surfaces, and said other member, whereby, when under a load, the outer member is urged to assume a position concentric to the centre of rotation.

9. In a friction gear an element comprising an inner member, concentrically disposed with regard to the centre of rotation, an outer member eccentrically disposed with respect to the centre of rotation, said members rotating as one body, peripheral cam surfaces upon one member and balls, engaging said cam surfaces and said other member, whereby when under load the outer member is urged to assume a position concentric to the centre of rotation.

10. In a friction gear an element comprising an inner member, concentrically disposed with regard to the centre of rotation, an outer member, eccentrically disposed with respect to the centre of rotation, said members rotating as one body, peripheral cam surfaces upon said first member and rollers, engaging said cam surfaces, and said outer member, whereby, when under a load, the outer member is urged to assume a position concentric to the centre of rotation.

11. In a friction gear an element comprising an inner member, concentrically disposed with regard to the centre of rotation. an outer member, eccentrically disposed with respect to the centre of rotation, said members rotating as one body, peripheral cam surfaces upon said first member and balls, engaging said cam surfaces and said outer member, whereby, when under a load, the outer member is urged to assume a position concentric to the centre of rotation.

12. In a friction gear, an element comprising an inner member, concentrically disposed with regard to the centre of rotation, an outer member, eccentrically disposed with respect to the centre of rotation, said members rotating as one body, peripheral cam surfaces upon one of said members and rollers, engaging said cam surfaces, and the other member, whereby, when under a load, the outer member is urged to assume a position concentric to the centre of rotation.

13. In a friction gear an element comprising an inner member, concentrically disposed with regard to the centre of rotation, an outer member, eccentrically disposed with respect to the centre of rotation, said members rotating as one body, peripheral cam surfaces upon one of said members and balls, engaging said cam surfaces and the other member, whereby, when under a load, the outer member is urged to assume a position concentric to the centre of rotation.

14. In a friction gear, a friction element comprising a pair of approximately co-axial rotary members rotary substantially as one body and having slight relative rotation and whose axes have slight relative movement lateral to each other; one of the members being an engagement member having a friction periphery for frictionally engaging another element in power transmitting relation; and means interposed between said members for automatically causing said relative movement when the members are relatively slightly rotated.

15. In a friction gear, a friction element comprising a pair of approximately co-axial rotary members whose axes have slight relative movement while remaining substantially parallel; one of the members being an engagement member having a periphery for frictionally engaging another element in power transmitting relation; and rigid means interposed between said members for automatically causing said relative movement when a load is imposed.

16. In a friction gear, a friction element comprising a pair of approximately co-axial rotary members having slight relative rotation and whose axes have slight relative movement lateral to each other; one of the members being an engagement member having a continuous friction periphery of constant length; and means interposed between said members for automatically causing said relative movement when the members are relatively slightly rotated.

17. In a friction gear, a friction element comprising a pair of approximately co-axial rotary members slightly eccentric to each other and having slight relative rotation and whose axes have slight relative movement toward each other; one of the members being an engagement member having a periphery for frictionally engaging another element; and means interposed between said members for automatically causing said relative movement when the members are relatively slightly rotated.

18. In a friction gear, a driving element and a driven element; one of said elements comprising a pair of rotary members rotating substantially as one body, and being slightly relatively movable, one of the members being an engagement member having a substantially annular face of substantially constant length frictionally engaging the other element; and means interposed between said members for automatically causing, when a load is imposed, adjustment of said engagement member into firm engagement with the other element.

19. In a friction gear, a driving element and a driven element; one of said elements comprising inner and outer rotary members rotating substantially as one body, and being slightly relatively movable in their own plane with one of the members being an engagement member having a periphery of substantially constant length frictionally engaging the other element; and means interposed between said members for causing, when a load is imposed, adjustment of said periphery into firm engagement with the other element.

20. In a friction gear, a driving element and a driven element; one of said elements comprising inner and outer rotary members rotating substantially as one body; the axes of said members being relatively movable toward or from each other; one of the members being an engagement member having a periphery frictionally engaging the other element; and means interposed between said members for causing, when a load is imposed, adjustment of said periphery into firm engagement with the other element.

21. In a friction gear, a driving element and a driven element; one of said elements comprising an inner and outer approximately coaxial rotary members having slight relative rotation and having their axes slightly relatively movable while remaining substantially parallel so that one of the members may frictionally firmly engage the other element; and means interposed between said members for automatically causing, when the members are relatively rotated, adjustment of the engaging member into firm engagement with the other element.

In testimony whereof I have hereunto set my hand.

RICHARD SAMUEL PRENDERGAST.